US009964645B2

(12) United States Patent
Scheitlin et al.

(10) Patent No.: US 9,964,645 B2
(45) Date of Patent: May 8, 2018

(54) SATELLITE MEASUREMENT SCREENING TO PROTECT THE INTEGRITY OF EXISTING MONITORS IN THE PRESENCE OF PHASE SCINTILLATION

(71) Applicant: Honeywell International Inc., Morristown, NJ (US)

(72) Inventors: Joseph E. Scheitlin, Plymouth, MN (US); Mats Anders Brenner, Plymouth, MN (US); Kim A. Class, Andover, MN (US); Bruce G. Johnson, Shoreview, MN (US); Randy J. Reuter, Brooklyn Park, MN (US); John M. Howard, St. Paul, MN (US)

(73) Assignee: Honeywell International Inc., Morris Plains, NJ (US)

( * ) Notice: Subject to any disclaimer, the term of this patent is extended or adjusted under 35 U.S.C. 154(b) by 912 days.

(21) Appl. No.: 14/193,773

(22) Filed: Feb. 28, 2014

(65) Prior Publication Data
US 2015/0247930 A1 Sep. 3, 2015

(51) Int. Cl.
G01S 19/07 (2010.01)
G01S 19/20 (2010.01)
(Continued)

(52) U.S. Cl.
CPC .............. G01S 19/07 (2013.01); G01S 19/20 (2013.01); G01S 19/08 (2013.01); G01S 19/15 (2013.01)

(58) Field of Classification Search
CPC .......... G01S 19/07; G01S 19/08; G01S 19/15; G01S 19/20; G01S 19/29; G01S 19/235;
(Continued)

(56) References Cited
U.S. PATENT DOCUMENTS 6,243,409 B1 * 6/2001 Fenton .................... G01S 19/22
375/130
6,448,925 B1 * 9/2002 Shridhara ............... G01S 19/21
342/357.59
(Continued)

FOREIGN PATENT DOCUMENTS

| CN | 101806911 | 8/2010 |
| WO | 2009125011 | 10/2009 |

OTHER PUBLICATIONS

More Ionosphere Anomaly Mitigation Considerations for Category II/III GBAS (2007), T. Murphy, M.Harris, Boeing Commercial Airplanes.*

(Continued)

Primary Examiner — Bernarr E Gregory
(74) Attorney, Agent, or Firm — Fogg & Powers LLC

(57) ABSTRACT

A method of implementing a real-time screening process for phase scintillation is presented. The method includes detecting a phase scintillation event during a sample time period at a phase scintillation monitor; excluding associated satellite measurement data from further use based on the detection of the phase scintillation event at the phase scintillation monitor; detecting an end to the phase scintillation event at the phase scintillation monitor; and readmitting associated satellite measurement data collected after the end of the phase scintillation event as detected by the phase scintillation monitor.

19 Claims, 5 Drawing Sheets

(51) Int. Cl.
*G01S 19/08* (2010.01)
*G01S 19/15* (2010.01)
*G01S 19/00* (2010.01)

(58) Field of Classification Search
CPC ........ G01S 19/44; G01S 19/215; G01S 19/21;
G01S 19/05; G01S 19/41; G01S 19/01;
G01S 19/03; G01S 19/13; G01S 19/14;
G01S 19/22; G01S 19/23; G01S 19/35;
G01S 19/37
USPC .................................................... 342/357.44
See application file for complete search history.

(56) References Cited

U.S. PATENT DOCUMENTS

| | | | | |
|---|---|---|---|---|
| 6,693,979 | B1* | 2/2004 | Kumar | G01S 19/37 375/326 |
| 6,888,498 | B2* | 5/2005 | Brenner | G01S 19/235 342/357.29 |
| 6,934,632 | B2* | 8/2005 | Hatch | G01S 19/44 701/477 |
| 8,013,789 | B2* | 9/2011 | van Graas | G01S 19/29 342/357.46 |
| 8,077,085 | B2* | 12/2011 | Huang | G01S 19/41 342/357.24 |
| 8,094,064 | B2 | 1/2012 | Brenner | |
| 8,134,497 | B2* | 3/2012 | Janky | G01S 19/07 342/357.24 |
| 8,253,624 | B2* | 8/2012 | King | G01S 19/21 342/357.59 |
| 9,250,327 | B2* | 2/2016 | Kelley | G01S 19/07 |
| 9,405,015 | B2* | 8/2016 | Berchin | G01S 19/41 |
| 2003/0011514 | A1* | 1/2003 | Kirchofer | G01S 19/21 342/372 |
| 2013/0063308 | A1* | 3/2013 | Krasner | G01S 19/05 342/393 |
| 2015/0253431 | A1* | 9/2015 | Averin | G01S 19/07 342/357.26 |
| 2016/0154109 | A1* | 6/2016 | Achanta | G01S 19/215 342/357.58 |

OTHER PUBLICATIONS

European Patent Office, "Extended European Search Report from EP Application No. 15155287.4 dated Jul. 29, 2015", "From Foreign Counterpart of U.S. Appl. No. 14/193,773", dated Jul. 29, 2015, pp. 1-6, Published in: EP.

Murphy et al., "More Ionoshphere Anomaly Mitigation Considerations for Category II/III GBAS", "GNSS 2007—Proceedings of the 20th International Technical Meeting of the Satellite Division of the Institute of Navigation", Sep. 28, 2007, pp. 438-452, Publisher: The Institute of Navigation, Published in: US.

Rodrigues et al., "Statistical Analysis of GPS Ionospheric Scintillation and Short-Time TEC Variations Over Northern Europe", "Navigation: Journal of the Institute of Navigation", Jun. 1, 2004, pp. 59-75, vol. 51, No. 1, Publisher: Institute of Engineering Surveying and Space Geodesy, The University of Nottingham, Published in: GB.

Rodriquez et al., "Real-Time Detection of Ionoshpheric Scintillations and Potential Applications", "GNSS 2008—Proceedings of the 21st International Technical Meeting of the Satellite Division of the Institute of Navigation", Sep. 19, 2008, pp. 277-288, Publisher: The Institute of Navigation, Published in: US.

Ganguly et al., "Ionospheric scintillation monitoring and mitigation using a software GPS receiver", "Radio Science", Jan. 28, 2004, pp. 1-4, vol. 39, No. 1.

* cited by examiner

SATELLITE MEASUREMENT SCREENING TO PROTECT THE INTEGRITY OF EXISTING MONITORS IN THE PRESENCE OF PHASE SCINTILLATION

BACKGROUND

Ground Based Augmentation Systems (GBAS) for Global Navigation Satellite Systems (GNSS) broadcast one or more parameters that can be received by a GNSS receiver to correct for various errors in the satellite signals received. A scintillation threat occurs when ionospheric scintillation disturbances cause errors in the received satellite signals (Global Positioning System (GPS) signals). Ionospheric (iono) scintillation is a fluctuation of the GPS signal amplitude and/or phase, generated as the signal passes through localized anomalies in the total electron content (TEC) in the ionosphere. Ionospheric (iono) phase scintillation causes a rapid fluctuation of the phase of GPS signals passing through the ionosphere. These disturbances in the phase may affect the ability of the satellite systems Ground Based Augmentation System (GBAS) to detect out of tolerance precision approach information for an aircraft that is landing at an airport serviced by a ground station.

Since scintillation is not a rare occurrence, the ionosphere scintillation threatens satellite systems by generating "blinding" or false trip scenarios for some of the satellite fault monitors in the ground station sub-system. Additionally, ionosphere scintillation may cause an integrity monitor's underlying test statistic and its associated bounding sigma ($\sigma$) to be significantly different than expected and thereby unable to meet its required performance.

SUMMARY

The present application relates to a method of implementing a real-time screening process for phase scintillation. The method includes detecting a phase scintillation event during a sample time period at a phase scintillation monitor; excluding associated satellite measurement data from further use based on the detection of the phase scintillation event at the phase scintillation monitor; detecting an end to the phase scintillation event at the phase scintillation monitor; and readmitting associated satellite measurement data collected after the end of the phase scintillation event as detected by the phase scintillation monitor.

DRAWINGS

Understanding that the drawings depict only exemplary embodiments and are not therefore to be considered limiting in scope, the exemplary embodiments are described with additional specificity and detail through the use of the accompanying drawings, in which.

Figure 4:
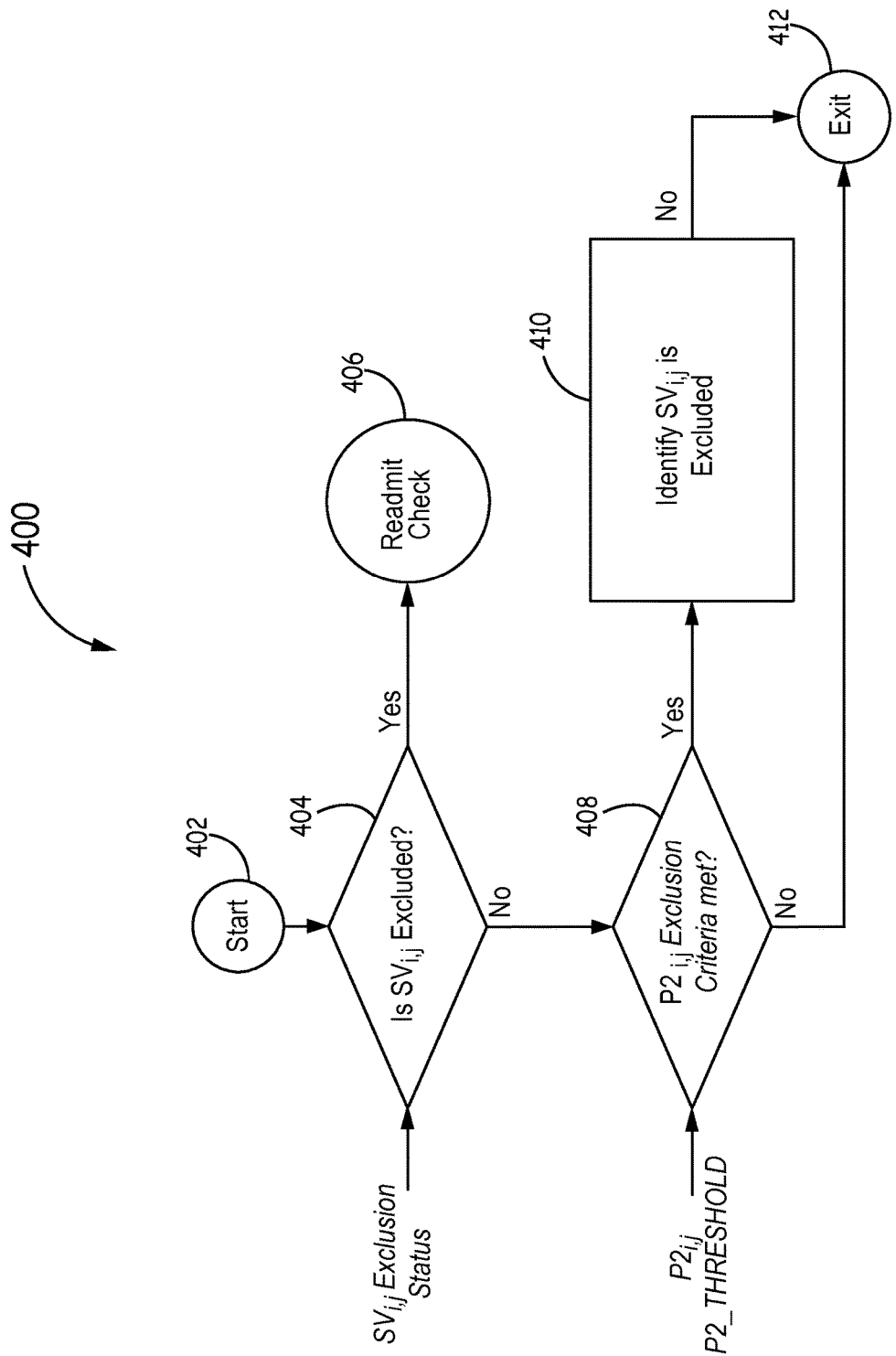
Figure 5:
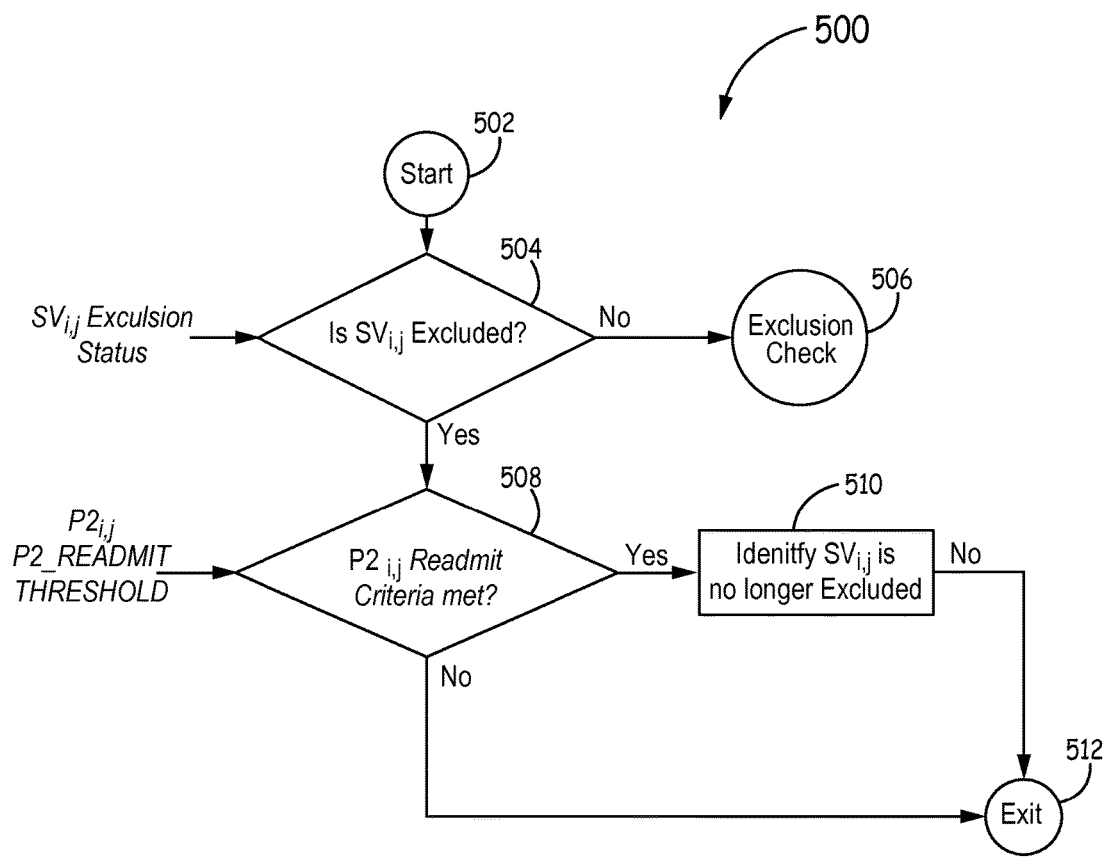

FIG. 4 shows a flow diagram of a method of excluding satellite measurement data from further use once a phase scintillation monitor discriminator (P2) measurement has reached an exclusion level in accordance with the present application; and FIG. 5 shows a flow diagram of a method of readmitting the use of the satellite measurement data once a phase scintillation monitor discriminator (P2) measurement has achieved its readmittance criteria in accordance with the present application.

In accordance with common practice, the various described features are not drawn to scale but are drawn to emphasize specific features relevant to the exemplary embodiments.

DETAILED DESCRIPTION

Ionospheric phase scintillation is an environmental condition which can impact the GPS satellite signal reception. In order to address the above referenced problems and to protect the satellite systems monitors, a screening process and system described herein screens out satellite measurement data that can potentially corrupt monitor operations. The screening process described herein excludes satellite measurement data obtained during a scintillation event and readmits satellite measurement data obtained after the scintillation event is determined to be over. Specifically, a phase scintillation monitor and satellite measurement data exclusion and re-admittance process to screen satellite measurement data affected by a phase scintillation event is described herein. This exclusion and re-admittance process ensures that the resultant GPS signals continue to protect system integrity; i.e., the existing monitors still meet their integrity requirements. This screening process is used as part of a GBAS. GBAS is used to provide precision landing services to the aviation community. The screening process detects unfavorable satellite measurement data and prohibits its use in monitors while enabling valid data to pass. The valid satellite measurement data, which is allowed to pass thru this screening process, enables the remaining functions/monitors to operate properly to insure system integrity.

The phase scintillation monitor described herein is designed to screen satellite measurement data for phase scintillation and to remove that measurement data when its use degrades the system's ability to protect integrity. The phase scintillation is monitored for each satellite measurement used in the GBAS. The screening is based on the variance of the carrier phase estimate in the satellite measurement.

Figure 1:
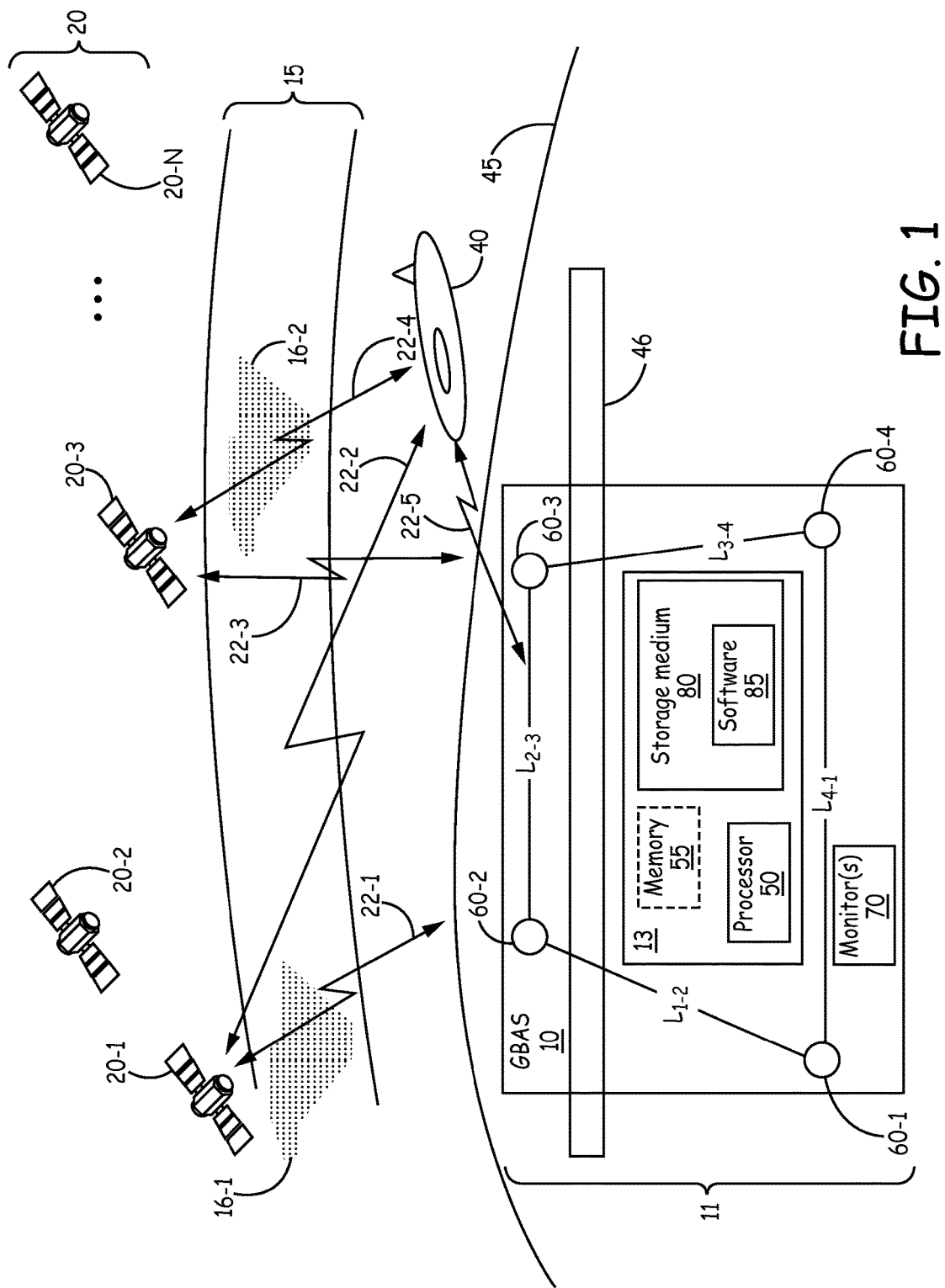
FIG. 1 shows an aircraft communicatively coupled to a satellite system and a ground based augmentation system that provides real-time screening for phase scintillation in accordance with the present application.

FIG. 1 shows an aircraft 40 communicatively coupled to a satellite system 20 including a plurality of satellites 20(1-N) and a communicatively coupled GBAS 10 that provides real-time screening based on phase scintillation in accordance with the present application. The aircraft 40 is also referred to herein as "airborne vehicle 40". The GBAS 10 utilizes the received satellite signals to augment the positional accuracy in certain applications. For example, ground-based augmentation systems can increase the accuracy in precision aircraft approach applications. The ground based augmentation system 10 is part of a ground station 11 that is associated with a runway 46 at an airport. The horizon of the earth is represented generally at 45. The ionosphere 15 is a layer of the atmosphere that is between the satellites 20(1-N) and the earth 45. As shown in FIG. 1, localized anomalies in total electron content (TEC) represented generally at 16-1 and 16-2 are in portions of the ionosphere 15.

The localized anomalies in TEC 16(1-2) depict all scintillation events but herein we refer to them as "phase scintillation events 16(1-2)" only. The phase scintillation events 16(1-2) are signal-perturbing features of the ionosphere 15 that affect the signal phase and that change in time and are found in different portions of the ionosphere 15 at different times.

The ground based augmentation system 10 includes at least one monitor 70, a plurality of reference receivers (RRs) 60(1-4), and a phase scintillation monitor 13. The phase scintillation monitor 13 includes a processor 50, storage medium 80, software 85, and optional memory 55. The processor 50 is communicatively coupled to receive input from the plurality of satellites 20(1-N) via the plurality of reference receivers (RRs) 60(1-4). As is known to one skilled in the art, the integrity monitors 70 and the GBAS 10 also interface with a processor and have software and memory. In order to simplify the drawings, these are not shown in FIG. 1.

The first reference receiver 60-1 is a distance $L_{1-2}$ from the second reference receiver 60-2. The second reference receiver 60-2 is a distance $L_{2-3}$ from the third reference receiver 60-3. The third reference receiver 60-3 is a distance $L_{3-4}$ from the fourth reference receiver 60-4. The fourth reference receiver 60-4 is a distance $L_{4-1}$ from the first reference receiver 60-1. The distances between the reference receivers 60(1-4) are referred to herein as baselines.

The at least one monitor 70 is also referred to herein as "integrity monitors 70". As described above, phase scintillation can degrade the test statistics of some integrity monitors 70. This application focuses on mitigation of the impact of the phase scintillation threat on these monitors 70.

The scintillation threat is mitigated by implementing a real-time phase scintillation screening process that screens satellite measurements for undesirable levels of phase scintillation, thereby preventing corruption of the integrity monitors 70. The phase scintillation monitor discriminator is referred to herein as P2. The real-time screening process also determines when the phase scintillation event is over and readmits satellite measurement data collected from the previously screened measurement source. The re-admittance occurs when the phase scintillation monitor discriminator satisfies the re-admittance criteria, as described below.

The process used to create the phase scintillation monitor discriminator P2 is computed and evaluated for all pairs of reference receivers (RR) and tracked satellites for which an accumulated delta range measurement is available. The term accumulated delta range refers to measurement data received from a reference receiver/satellite pair which is comprised of the accumulation of the carrier phase cycles, converted to meters, which have been received since first tracking the satellite signal. Every reference receiver that receives a signal from a satellite is defined to be a reference receiver/satellite pair $RR_i/SV_j$. The terms "space vehicle" (SV) and "satellite" are used interchangeably herein. The reference receiver/satellite pair $RR_i/SV_j$ in a current sample time period is also referred to herein as $SV^i_j$. For example, as shown in FIG. 1, the satellite signal is received, via wireless communication link 22-1, at the second reference receiver 60-2 from the first satellite 20-1 so the second reference receiver 60-2 and the first satellite 20-1 are a reference receiver/satellite pair $RR_2/SV_1$. Of course, the same satellite signal is also received, via a wireless communication link, at the first reference receiver 60-1, if the first reference receiver 60-1 is in the reception area of the first satellite 20-1, so the first reference receiver 60-1 and the first satellite 20-1 form a reference receiver/satellite pair $RR_1/SV_1$. The reception area for a satellite is that area of the earth that is able to receive (exposed to) signals from the satellite. The reception area changes with time as the satellite orbits the earth and as the earth rotates. A reception mask may be applied to limit acceptance of these satellite signals below a certain elevation. A broadcast signal, which is sent via wireless communication link 22-5 to the aircraft 40, only includes data from those satellites that are not excluded based on the phase scintillation monitor discriminator 13.

Figure 2:
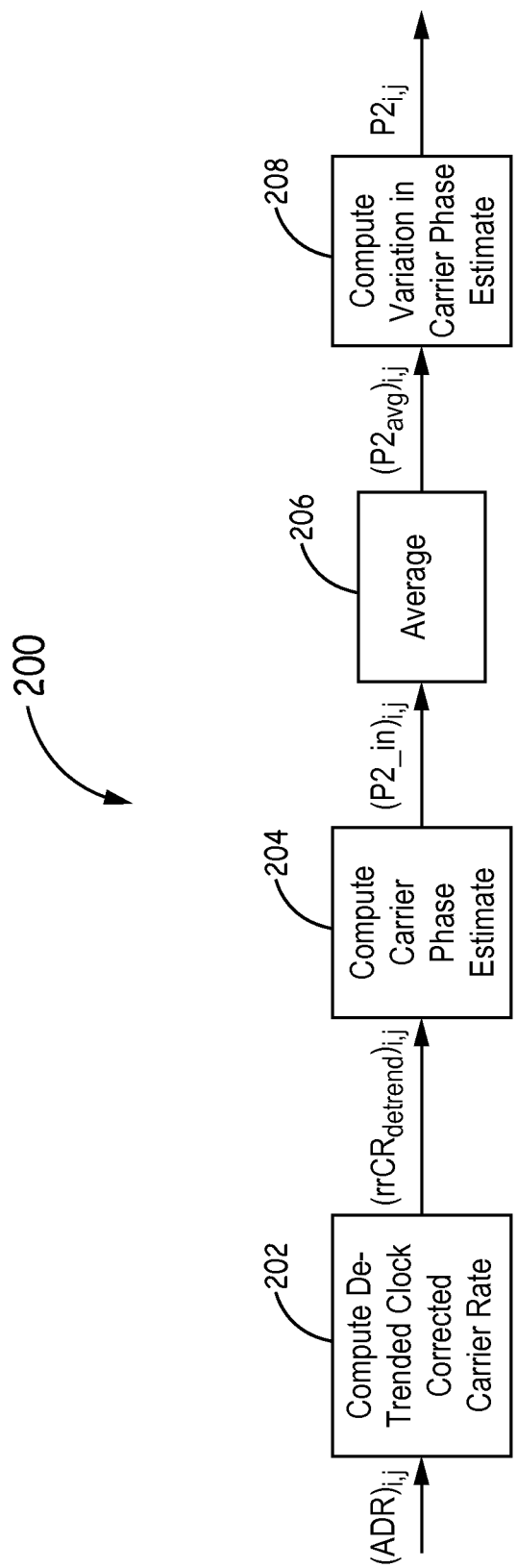
FIG. 2 shows a flow diagram of a method to compute a phase scintillation monitor discriminator in accordance with the present application.

FIG. 2 shows a flow diagram of a method 200 to compute a phase scintillation monitor discriminator (P2) in accordance with the present application. The method 200 is implemented for each of the reference receiver/satellite pairs $RR_i/SV_j$ in each sample time period by processor 50 executing software 85 in the phase scintillation monitor 13 (FIG. 1). The phase scintillation monitor discriminator (P2) is also referred to herein as a "phase scintillation monitor discriminator (P2) measurement" and "variation in the carrier phase estimate", the $P2^i_j(k)$ at a sample time k for $RR_i$ and $SV_j$, and a "variation in the phase of the carrier". The term "carrier rate" is the rate of change in the accumulated delta range, and is herein used interchangeably as "delta accumulated delta range" or "delta carrier rate" or "Δcarrier". A phase scintillation monitor discriminator $(P2)^i_j(k)$ is computed and evaluated for each reference receiver/satellite pair $RR_i/SV_j$ for which accumulated delta range (ADR) data is available.

At block 202, reference receiver clock corrected carrier rates are calculated for respective reference receiver/satellite pairs for which accumulated delta range data is available. The processor 50 (FIG. 1) determines if the accumulated delta range data is available for the reference receiver/satellite pairs. In general, the SV motion and SV clock corrected carrier rate of $SV_j$, and $RR_i$ is computed at time period k as shown below. The SV motion and SV clock corrected carrier rate, $(cr\_corrected^i_j(k))$, is calculated for each reference receiver/satellite pair $RR_i/SV_j$ within the reception area.

Compute the SV motion and SV clock corrected carrier rate value as follows:

$$cr\_corrected^i_j(k) = \qquad \text{Eq. (1)}$$
$$(acc^i_j(k) - acc^i_j(k-1)) - (range^i_k(k) - range^i_j(k-1)) +$$
$$(svclk^i_j(k) - svclk^i_j(k-1)) + (tropo_j(k) - tropo_j(k-1))$$

where:
  $cr\_corrected^i_j(k)$ is the SV motion and SV clock corrected carrier rate for $RR_i/SV_j$ at time k;
  $acc^i_j(k)$ is the accumulated delta range on $RR_i/SV_j$ at time k;
  $acc^i_j(k-1)$ is the accumulated delta range on $RR_i/SV_j$ at time k-1;
  $range^i_j(k)$ is the range from $SV_j$ to $RR_i$ at time k;
  $range^i_j(k-1)$ is the range from $SV_j$ to $RR_i$ at time k-1;
  $svclk^i_j(k)$ is the $SV_j$ ephemeris clock value seen by $RR_i$ at time k;
  $svclk^i_j(k-1)$ is the $SV_j$ ephemeris clock value seen by $RR_i$ at time k-1;
  $tropo^i_j(k)$ is the tropospheric delay estimate for $RR_i/SV_j$ at time k; and
  $tropo^i_j(k-1)$ is the tropospheric delay estimate for $RR_i/SV_j$ at time k-1.

In this manner, the SV motion and SV clock corrected carrier measurement of $SV_j$, and $RR_i$ is computed at time period k.

The SV motion and SV clock corrected carrier rate are compensated for the reference receiver clock by subtracting the average of all the other SV motion and SV clock corrected carrier rates on this RR from this carrier rate to obtain the reference receiver clock corrected carrier rate, $(rrCR)^i_j(k)$. The reference receiver clock corrected carrier rate for each reference receiver/satellite pair $RR_i/SV_j$ in the $k^{th}$ sample time period is calculated as follows:

$$rrCR^i_j(k) = \text{cr\_corrected}^i_j(k) - \frac{1}{N_{sv}-1}\left(\sum_{n=1;n\neq j}^{N_{SV}} \text{cr\_corrected}^i_n\right) \quad \text{Eq. (2)}$$

where:
  $rrCR^i_j(k)$ is the reference receiver clock corrected carrier rate for $RR_i/SV_j$ at time k
  $\text{cr\_corrected}^i_j(k)$ is the SV motion and SV clock corrected carrier rate for $RR_i/SV_j$ at time k
  $N_{sv}$ is the number of satellites on $RR_i$ with a $\text{cr\_corrected}^i_j$ value at time k.

A running average of the reference receiver clock corrected carrier rate for each reference receiver/satellite pair $RR_i/SV_j$ in the $k^{th}$ sample time period is calculated as follows. In one implementation of this embodiment, the running average is computed over 40 samples with the duration of each time period being ½ second, although other sample counts and durations are possible.

$$\text{AVG\_CR}^i_j(k) = \frac{1}{40}\sum_{n=0}^{39} rrCR^i_j(k-n) \quad \text{Eq. (3)}$$

where:
  $\text{AVG\_CR}^i_j(k)$ is the running average of the reference receiver clock corrected carrier rate for $RR_i/SV_j$ at time k; and
  $rrCR^i_j(k-n)$ is the reference receiver clock corrected carrier rate for $RR_i/SV_j$ at time k−n.

The reference receiver de-trended SV motion and SV clock corrected carrier rate at time k, $(rrCR_{detrend})^i_j(k)$, is the difference in the reference receiver clock corrected carrier rate, $(rrCR)^i_j(k)$, and the average reference receiver clock corrected carrier rate, $(\text{AVG\_CR})^i_j(k)$. The reference receiver de-trended SV motion and SV clock corrected carrier rate, $(rrCR_{detrend})^i_j(k)$ is calculated for each reference receiver/satellite pair $RR_i/SV_j$ in the $k^{th}$ sample time period as follows:

$$(rrCR_{detrend})^i_j(k) = (rrCR)^i_j(k) - (\text{AVG\_CR})^i_j(k) \quad \text{Eq. (4)}$$

where:
  $(rrCR_{detrend})^i_j(k)$ is the reference receiver de-trended SV motion and SV clock corrected carrier rate for $RR_i/SV_j$ at time k;
  $rrCR^i_j(k-n)$ is the reference receiver clock corrected carrier rate for $RR_i/SV_j$ at time k−n; and
  $\text{AVG\_CR}^i_j(k)$ is the running average of the reference receiver clock corrected carrier rate for $RR_i/SV_j$ at time k.

In this manner, the reference receiver de-trended SV motion and SV clock corrected carrier rate $(rrCR_{detrend})^i_j(k)$ is calculated for each valid reference receiver/satellite pair $RR_i/SV_j$ at time k.

At block 204, a carrier phase estimate $(P2_{in})^i_j(k)$ is computed using trapezoidal integration. The reference receiver clock corrected carrier rate that was calculated in block 202 is integrated for each of the reference receiver/satellite pairs $RR_i/SV_j$. In this manner, the carrier phase estimate of satellite measurement j on reference receiver i in the current sample time period, k, represented as $(P2_{in})^i_j(k)$, is calculated for each of the reference receiver/satellite pairs $RR_i/SV_j$ in the current sample time period. The terms "carrier phase estimate" and "carrier phase" are used interchangeably herein and are both represented as $(P2_{in})^i_j$. The carrier phase estimate $(P2_{in})^i_j(k)$ is generated by integrating the reference receiver clock corrected carrier rate for each reference receiver/satellite pair $RR_i/SV_j$.

The carrier phase estimate $(P2_{in})^i_j(k)$ is generated by numerical integration (using trapezoidal integration) as follows:

$$(P2_{in})^i_j(k) = (P2_{in})^i_j(k-1) + \frac{(rrCR_{detrend})^i_j(k) + (rrCR_{detrend})^i_j(k-1)}{2.0} \times CNV \times \Delta t \quad \text{Eq. (5)}$$

where:
  $(P2_{in})^i_j(k)$ is the carrier phase estimate for $RR_i/SV_j$ at time k;
  $(rrCR_{detrend})^i_j(k)$ is the reference receiver de-trended SV motion and SV clock corrected carrier rate for $RR_i/SV_j$ at time k;
  $\Delta t$ is the time period duration (½: second in this embodiment); and
  CNV converts meters per ½ second to meters per second (2.0 when $\Delta t$ is 0.5 seconds).

At block 206, an average of the carrier phase estimate $(P2_{avg})^i_j(k)$ is calculated for each reference receiver/satellite pair $RR_i/SV_j$ as follows:

$$(P2_{avg})^i_j(k) = \frac{1}{K_p}\sum_{n=k-(K_p-1)}^{k}(P2_{in})^i_j(n) \quad \text{Eq. (6)}$$

where:
  $(P2_{avg})^i_j(k)$ is the average carrier phase estimate for $RR_i/SV_j$ at time k;
  $(P2_{in})^i_j(k-n)$ is the carrier phase estimate for $RR_i/SV_j$ at time k−n; and
  $K_p$ is the number of samples in the average carrier phase estimate (30 in this embodiment, although other values are possible).

At block 208, a variation in the carrier phase estimate is computed for each reference receiver/satellite pair $RR_i/SV_j$ in the current sample time period. The terms "a variation in the carrier phase estimate" and "phase scintillation monitor discriminator measurement" are used interchangeably herein and are both represented as $(P2)^i_j(k)$ for the $k^{th}$ sample.

Each satellite's variation in the carrier phase estimate for $SV_j$ on $RR_i$ for the current sample time period is computed as follows:

$$(P2)_{i,j}(k) = \sqrt{\frac{\sum_{n=k-(K_p-1)}^{k}\left((P2_{in})_{i,j}(n) - (P2_{avg})_{i,j}(k)\right)^2}{(K_p-1)}} \quad \text{Eq. (7)}$$

where:
- $(P2)^i_j(k)$ is the variation in the carrier phase estimate for $RR_i/SV_j$ at time k;
- $(P2_{avg})^i_j(k)$ is the average carrier phase estimate for $RR_i/SV_j$ at time k;
- $(P2_{in})^i_j(k-n)$ is the carrier phase estimate for $RR_i/SV_j$ at time k-n; and
- $K_p$ is the number of samples in the average carrier phase estimate (30 in this embodiment, although other values are possible).

Figure 3:
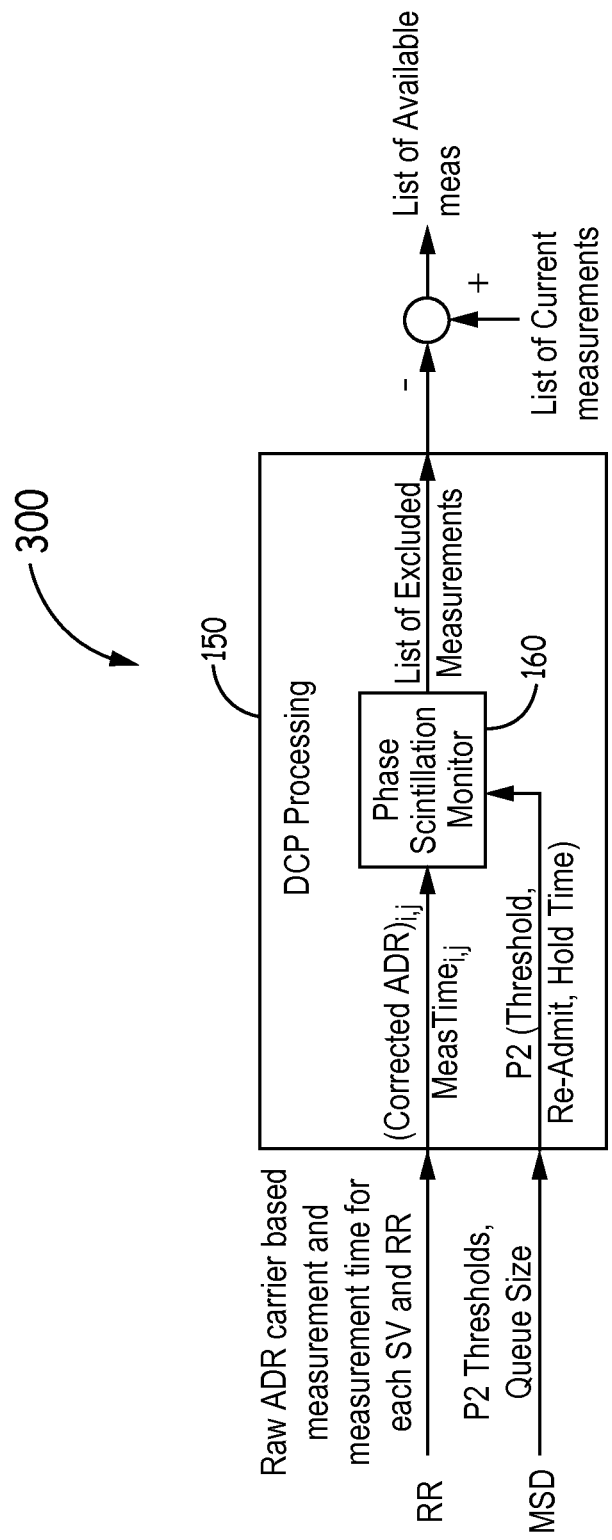
FIG. 3 shows a differential correction processor (DCP) processing diagram used to determine if satellite measurement data associated with a phase scintillation monitor discriminator measurement is to be excluded in accordance with the present application.

FIG. 3 shows a differential correction processor (DCP) processing diagram 150 used to determine if a satellite measurement of the associated phase scintillation monitor discriminator measurement is to be excluded in accordance with the present application. For each sample, the reference receivers 60(1-4) (FIG. 1) provide the raw accumulated delta range carrier based measurement and the measurement time to the processor 50 (FIG. 1) from the satellites (space vehicle (SV)) 20(1-N). The processor 50 also receives as inputs the P2 exclusion threshold, the P2 re-admittance threshold, the hold times, and the queue sizes. In one implementation of this embodiment, this input data is stored in the memory 55 prior to being input to the processor 50. The P2 exclusion threshold is also referred to herein as "a measurement exclusion threshold", "an exclusion threshold" and "an SV measurement exclusion threshold" all of which are represented as P2_THRESHOLD. The P2 re-admittance threshold is also referred to herein as "a measurement re-admittance threshold", "a re-admittance threshold" and "an SV measurement re-admittance threshold" all of which are represented as P2_READMIT THRESHOLD.

During each sample time period, the processor 50 (FIG. 1) receives the input and executes the phase scintillation monitor software 160 to determine if the associated satellite measurement data is to be excluded. A reference receiver/satellite pair $RR_i/SV_j$ for which the phase scintillation monitor discriminator measurement for the associated satellite measurement data is to be excluded is referred to herein as an excluded reference receiver/satellite pair $RR_i/SV_j$ (or $RR_i/SV_{j\_excluded}$). As shown in FIG. 3, the phase scintillation monitor software 160 outputs the list of excluded satellite measurements, which are used to determine the available measurements. The available measurements are the current set of measurements less the list of excluded measurements output from the phase scintillation monitor software 160.

The flow of the execution of the phase scintillation monitor software 160 is shown as the methods 400 and 500 of FIGS. 4 and 5. FIG. 4 shows a flow diagram of a method 400 of excluding satellite measurement data associated with its phase scintillation monitor discriminator (P2) measurement in accordance with the present application. The terms "phase scintillation monitor discriminator (P2) measurement" and "variation in the carrier phase estimate", the $P2^i_j(k)$ measurement, are herein used interchangeably. The method 400 is executed for each sample time period, k. In one implementation of this embodiment, the sample time period has a duration of ½ second, although other durations for the sample time period are possible.

At block 402, the process starts. At block 404, it is determined if the reference receiver/satellite pairs $RR_i/SV_j$ (i.e., $SV^i_j$) in the current sample time period is currently excluded. If $SV^i_j$ is currently excluded, the satellite measurement data of satellite measurement j on reference receiver i in the current sample time period k, $SV^i_j(k)$ is currently excluded.

If $SV^i_j(k)$ is currently excluded, then $SV^i_j$ was excluded in a previous sample time period (e.g., during the $(k-1)^{th}$ sample time period through the $(k-n)^{th}$ sample time period, where "n" is a positive integer), the flow proceeds to block 406 and a readmit check is performed. In this case, the flow proceeds from block 406 to block 502 of method 500 in FIG. 5, which is described below.

If $SV^i_j(k)$ is not currently excluded, the flow proceeds from block 404 to block 408. At block 408, it is determined if the phase scintillation monitor discriminator measurement $P2^i_j(k)$ has met its exclusion criteria. This process is repeated for each of the reference receiver/satellite pairs $RR_i/SV_j$.

In one implementation of this embodiment, the exclusion criteria is met if $P2^i_j(k)$ is greater than the exclusion threshold (e.g., the P2 threshold). In another implementation of this embodiment, the exclusion criteria is met if $P2^i_j(k)$ is greater than or equal to the P2 threshold. The P2 threshold (exclusion threshold) is stored in memory 55 (FIG. 1) and/or the processor 50 (FIG. 1). In either case, the phase scintillation monitor discriminator measurements $P2^i_j(k)$ for the respective reference receiver/satellite pairs $RR_i/SV_j$ are each compared to the exclusion threshold. Other exclusion criteria are possible.

If $P2^i_j(k)$ has met its exclusion criteria for one (or more) of the reference receiver/satellite pairs $RR_i/SV_j$, that one (or more) reference receiver/satellite pair $RR_i/SV_j$ is an excluded reference receiver/satellite pair $RR_i/SV_j$ excluded. In one implementation of this embodiment, two or more of reference receiver/satellite pairs $RR_i/SV_j$ have a $P2^i_j(k)$ that is equal to or greater than the P2 exclusion threshold. In that case, those reference receiver/satellite pairs $RR_i/SV_j$ are defined to be excluded reference receiver/satellite pairs $RR_i/SV_{j\_excluded}$ and the data sent from the satellite in the excluded reference receiver/satellite pairs $RR_i/SV_{j\_excluded}$ is not used in the downstream monitors 70 and is not a part of the broadcast sent via wireless communication link 22-5 (FIG. 1). Then the flow proceeds to block 410 for the one or more excluded reference receiver/satellite pairs $RR_i/SV_{j\_excluded}$. At block 410, that one (or more) reference receiver/satellite pair $RR_i/SV_j$ is identified as an excluded reference receiver/satellite pair $RR_i/SV_{j\_excluded}$. In this manner, the data from the satellite in the reference receiver/satellite pair for an excluded reference receiver/satellite pair $RR_i/SV_{j\_excluded}$ is no longer used in the downstream monitors 70 and is not part of the broadcast sent via wireless communication link 22-5 (FIG. 1) when the phase scintillation monitor discriminator measurement for the excluded reference receiver/satellite pair $RR_i/SV_{j\_excluded}$ is determined (upon comparison with the exclusion threshold) to be equal to or greater than an exclusion threshold (i.e., P2_THRESHOLD). Then, the flow proceeds to block 412 and the flow exits the process for the current sample time period.

If $P2^i_j(k)$ has not met the exclusion criteria, the flow proceeds from block 408 to block 412 and the flow for that one (or more) non-excluded reference receiver/satellite pair $RR_i/SV_j$ exits the process for the current sample time period. In one implementation of this embodiment, if $P2^i_j(k)$ is less than the P2 exclusion threshold for one (or more) of the reference receiver/satellite pairs $RR_i/SV_j$, then that one (or more) of the reference receiver/satellite pairs $RR_i/SV_j$ is not excluded and the satellite measurement data continues to be used in the downstream monitors 70 and remains a part of the broadcast sent via wireless communication link 22-5 (FIG. 1).

FIG. 5 shows a flow diagram of a method 500 of readmitting satellite measurement data associated with a phase scintillation monitor discriminator (P2) measurement in accordance with the present application. The satellite measurement data is readmitted when it is determined that the phase scintillation event has ended. The method 500 is implemented for each of the reference receiver/satellite pairs $RR_i/SV_j$ by processor 50 executing software 85 in the phase scintillation monitor 13 (FIG. 1).

At block 502, the process starts. At block 504, it is determined if $SV^i_j(k)$ is currently excluded. If $SV^i_j(k)$ is not currently excluded (e.g., if $SV^i_j(k)$ for the reference receiver/satellite pair $RR_i/SV_j$ is not excluded in the $k^{th}$ sample time period), the flow proceeds to block 506 and an exclusion check is performed. The current sample period is the $k^{th}$ sample time period. In this case, the flow proceeds from block 506 to block 402 of method 400 in FIG. 4, for processing as described above.

If $SV^i_j(k)$ is currently excluded, the flow proceeds to block 508. At block 508, it is determined if $P2^i_j(k)$ in the current sample time period for an excluded reference receiver/satellite pair $RR_i/SV_j$ excluded meets the readmittance criteria.

In one implementation of this embodiment, the readmittance criteria is satisfied when the phase scintillation monitor discriminator $P2^i_j(k)$ in the current sample time period is less than the P2 readmit threshold. The P2 readmit threshold is preselected and is stored in memory 55 (FIG. 1) or in the processor 50 (FIG. 1). The processor 50 compares the phase scintillation monitor discriminator $P2^i_j(k)$ for the excluded reference receiver/satellite pair $RR_i/SV_{j\_excluded}$ to the P2 readmit threshold. Other readmittance criteria are possible.

In another implementation of this embodiment, the readmittance criteria is satisfied when $P2^i_j(k)$ is less than the P2 readmit threshold in the current sample time period for a preselected number M (where M is a positive integer) of samples that occurred prior to the current sample time period and after the reference receiver/satellite pair $RR_i/SV_j$ was excluded. In this embodiment, the processor 50 compares the phase scintillation monitor discriminator $P2^i_j(k)$ for the excluded reference receiver/satellite pair $RR_i/SV_{j\_excluded}$ to the P2 readmit threshold; counts the number of samples below the threshold since the reference receiver/satellite pair $RR_i/SV_j$ was excluded; and compares the counted number of samples below the threshold since the reference receiver/satellite pair $RR_i/SV_j$ was excluded to the stored preselected number M. The preselected number M is stored in memory 55 (FIG. 1) or in the processor 50 (FIG. 1).

In yet another implementation of this embodiment, the readmittance criteria is satisfied when $P2^i_j(k)$ in the current sample time period is less than the P2 readmit threshold for a preselected number M of consecutive samples that occurred consecutively just prior to the current sample time period. In yet another implementation of this embodiment, the readmittance criteria is satisfied when a preselected number M of samples have been counted regardless of the value of $P2^i_j(k)$ for those consecutive samples. These optional readmittance criteria are used as indications that the phase scintillation event has ended. Other readmittance criteria to indicate that the phase scintillation event has ended are possible.

If $P2^i_j(k)$ meets the readmittance criteria for an excluded reference receiver/satellite pair $RR_i/SV_{j\_excluded}$, the flow proceeds to block 510. At block 510, the satellite measurement of the excluded reference receiver/satellite pair is no longer excluded. The flow proceeds from block 510 to block 512 and the flow exits the process (block 512) for the current sample time period.

If at block 508, it is determined that $P2^i_j(k)$ does not meet the readmittance criteria for an excluded reference receiver/satellite pair $RR_i/SV_{j\_excluded}$, the satellite measurement of the excluded reference receiver/satellite pair $RR_i/SV_{j\_excluded}$ still is (remains) excluded. The flow proceeds to block 512. In this manner, satellite measurement data obtained from a reference receiver/satellite pair $RR_i/SV_j$ during a scintillation event is excluded from use in a navigation system and satellite measurement data from that excluded reference receiver/satellite pair $RR_i/SV_{j\_excluded}$ is readmitted after the scintillation event has ended for the excluded reference receiver/satellite pair $RR_i/SV_j$ excluded.

In one implementation of this embodiment, the presence/non-presence of phase scintillation using the carrier phase estimate is determined from 4 reference receivers. In another implementation of this embodiment, the carrier phase estimate used to detect phase scintillation is based on a P2 exclusion threshold of 0.05 meters and a readmit threshold of 0.013 meters for 10 consecutive samples.

The methods and techniques described here may be implemented in digital electronic circuitry, or with at least one processor (for example, a programmable processor, a special-purpose processor, a general-purpose processor such as a computer, or the processor 50 of FIG. 1) firmware, software, or in any combination of them. Apparatus embodying these techniques may include appropriate input and output devices, a processor, and a storage medium tangibly embodying program instructions for execution by the processor. A process embodying these techniques may be performed by at least one processor executing a program of instructions to perform desired functions by operating on input data and generating appropriate output. The techniques may advantageously be implemented in one or more programs that are executable on a programmable system including at least one processor coupled to receive data and instructions from, and to transmit data and instructions to, a data storage system, at least one input device, and at least one output device. Generally, a processor will receive instructions and data from a read-only memory and/or a random access memory.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Example Embodiments

Example 1 includes a method of implementing a real-time screening process for phase scintillation, the method comprising: detecting a phase scintillation event during a sample time period at a phase scintillation monitor; excluding associated satellite measurement data from further use based on the detection of the phase scintillation event at the phase scintillation monitor; detecting an end to the phase scintillation event at the phase scintillation monitor; and readmitting associated satellite measurement data collected after the end of the phase scintillation event as detected by the phase scintillation monitor.

Example 2 includes the method of Example 1, further comprising: calculating satellite (SV) motion and SV clock corrected carrier rates for reference receiver/satellite pairs for which accumulated delta range data is available; compensating a SV motion and a SV clock corrected carrier rate for a reference receiver clock by subtracting an average of all the other SV motion and SV clock corrected carrier rates from the SV motion and SV clock corrected carrier rates; and calculating a reference receiver de-trended SV motion and SV clock corrected carrier rate for the reference receiver/satellite pairs in a sample time period.

Example 3 includes the method of Example 2, further comprising: computing a carrier phase estimate using numerical integration; calculating a sample average of the carrier phase estimate for the reference receiver/satellite pairs; and calculating a variation in the carrier phase estimate for the reference receiver/satellite pairs in the current sample time period.

Example 4 includes the method of any of Examples 1-3, wherein detecting the phase scintillation event during the sample measurement at the phase scintillation monitor comprises: determining a phase scintillation monitor discriminator in a current sample time period for at least one reference receiver/satellite pair meets exclusion criteria.

Example 5 includes the method of Example 4, wherein determining the phase scintillation monitor discriminator in the current sample time period for at least one reference receiver/satellite pair meets the exclusion criteria comprises: determining the phase scintillation monitor discriminator in the current sample time period for the at least one reference receiver/satellite pair is one of: greater than an exclusion threshold; or equal to the exclusion threshold.

Example 6 includes the method of any of Examples 1-5, wherein detecting the end to the phase scintillation event comprises: determining a phase scintillation monitor discriminator in the current sample time period for an excluded reference receiver/satellite pair meets readmittance criteria.

Example 7 includes the method of Example 6, wherein determining the phase scintillation monitor discriminator in the current sample time period for the excluded reference receiver/satellite pair meets the readmittance criteria comprises: determining the phase scintillation monitor discriminator in the current sample time period for the excluded reference receiver/satellite pair is less than a readmit threshold.

Example 8 includes the method of any of Examples 6-7, wherein determining the phase scintillation monitor discriminator in the current sample time period for the excluded reference receiver/satellite pair meets the readmittance criteria comprises: determining the phase scintillation monitor discriminator in the current sample time period for the excluded reference receiver/satellite pair is less than a readmit threshold for a preselected number of samples.

Example 9 includes the method of any of Examples 6-8, wherein determining the phase scintillation monitor discriminator in the current sample time period for the excluded reference receiver/satellite pair meets the readmittance criteria comprises: determining the phase scintillation monitor discriminator in the current sample time period for the excluded reference receiver/satellite pair is less than a readmit threshold for a preselected number of consecutive samples.

Example 10 includes a phase scintillation monitor to provide real-time screening for phase scintillation, comprising: at least one processor communicatively coupled to receive input from a plurality of reference receivers; and a storage medium tangibly embodying program instructions for execution by the at least one processor, wherein the program instructions are operable, when executed by the at least one processor, to: detect a phase scintillation event during a sample time period; exclude associated satellite measurement data from further use based on the detection of the phase scintillation event; detect an end to the phase scintillation event; and readmit associated satellite measurement data collected after the end of the phase scintillation event.

Example 11 includes the phase scintillation monitor of Example 10, wherein the program instructions to detect the phase scintillation event during the sample measurement are further operable, when executed by the at least one processor, to: determine a phase scintillation monitor discriminator in a current sample time period for at least one reference receiver/satellite pair meets exclusion criteria.

Example 12 includes the phase scintillation monitor of Example 11, wherein the program instructions operable to determine the phase scintillation monitor discriminator in the current sample time period for the at least one reference receiver/satellite pair meets the exclusion criteria include program instructions operable, when executed by the at least one processor, to: determine the phase scintillation monitor discriminator in the current sample time period for the at least one reference receiver/satellite pair is one of: greater than an exclusion threshold; or equal to the exclusion threshold.

Example 13 includes the phase scintillation monitor of any of Examples 10-12, wherein the program instructions operable to detect the end to the phase scintillation event include program instructions operable, when executed by the at least one processor, to: determine a phase scintillation monitor discriminator in a current sample time period for an excluded reference receiver/satellite pair meets readmittance criteria.

Example 14 includes the phase scintillation monitor of Example 13, wherein the program instructions operable to determine the phase scintillation monitor discriminator in the current sample time period for the excluded reference receiver/satellite pair meets the readmittance criteria include program instructions operable, when executed by the at least one processor, to: determine the phase scintillation monitor discriminator in the current sample time period for the excluded reference receiver/satellite pair is less than a readmit threshold.

Example 15 includes the phase scintillation monitor of any of Examples 13-14, wherein the program instructions operable to determine the phase scintillation monitor discriminator in the current sample time period for the excluded reference receiver/satellite pair meets the readmittance criteria include program instructions operable, when executed by the at least one processor, to: determine the phase scintillation monitor discriminator in the current sample time period for the excluded reference receiver/satellite pair is less than a readmit threshold for a preselected number of samples.

Example 16 includes the phase scintillation monitor of any of Examples 10-15, wherein the program instructions are further operable, when executed by the at least one processor, to cause the phase scintillation monitor to: calculate a phase scintillation monitor discriminator in a current sample time period for at least one reference receiver/satellite pair.

Example 17 includes the phase scintillation monitor of Example 16, wherein the program instructions to calculate the phase scintillation monitor discriminator in the current sample time period for the at least one reference receiver/satellite pair include program instructions operable, when executed by the at least one processor, to: calculate satellite (SV) motion and SV clock corrected carrier rates for reference receiver/satellite pairs for which accumulated delta range data is available; compensate a SV motion and a SV clock corrected carrier rate for a reference receiver clock by subtracting an average of all the other SV motion and SV clock corrected carrier rates from the SV motion and SV clock corrected carrier rates; and calculate a reference receiver de-trended SV motion and SV clock corrected carrier rate for the reference receiver/satellite pairs in a sample time period.

Example 18 includes the phase scintillation monitor of Example 17, wherein the program instructions to calculate the phase scintillation monitor discriminator in the current sample time period for the at least one reference receiver/satellite pair further include program instructions operable, when executed by the at least one processor, to: compute a carrier phase estimate using numerical integration; calculate a sample average of the carrier phase estimate for the reference receiver/satellite pairs; and calculate a variation in the carrier phase estimate for the reference receiver/satellite pairs in the current sample time period, wherein the calculated variation in the carrier phase estimate is the phase scintillation monitor discriminator.

Example 19 includes a method to compute a phase scintillation monitor discriminator, the method comprising: calculating satellite (SV) motion and SV clock corrected carrier rates for reference receiver/satellite pairs for which accumulated delta range data is available; and compensating a SV motion and a SV clock corrected carrier rate for a reference receiver clock by subtracting an average of all the other SV motion and SV clock corrected carrier rates from the SV motion and SV clock corrected carrier rates.

Example 20 includes the method of Example 19, further comprising: calculating a reference receiver de-trended SV motion and SV clock corrected carrier rate for the reference receiver/satellite pairs in a sample time period; computing a carrier phase estimate using numerical integration; calculating a sample average of the carrier phase estimate for the reference receiver/satellite pairs; and calculating a variation in the carrier phase estimate for the reference receiver/satellite pairs in the current sample time period, wherein the variation in the carrier phase estimate is the phase scintillation monitor discriminator.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of implementing a real-time screening process for phase scintillation, the method comprising:
    detecting a phase scintillation event during a sample time period at a phase scintillation monitor;
    excluding associated satellite measurement data from further use based on the detection of the phase scintillation event at the phase scintillation monitor;
    detecting an end to the phase scintillation event at the phase scintillation monitor; and
    readmitting associated satellite measurement data collected after the end of the phase scintillation event as detected by the phase scintillation monitor.

2. The method of claim 1, further comprising:
    calculating satellite (SV) motion and SV clock corrected carrier rates for reference receiver/satellite pairs for which accumulated delta range data is available;
    compensating a SV motion and a SV clock corrected carrier rate for a reference receiver clock by subtracting an average of all the other SV motion and SV clock corrected carrier rates from the SV motion and SV clock corrected carrier rates; and
    calculating a reference receiver de-trended SV motion and SV clock corrected carrier rate for the reference receiver/satellite pairs in a sample time period.

3. The method of claim 2, further comprising:
    computing a carrier phase estimate using numerical integration;
    calculating a sample average of the carrier phase estimate for the reference receiver/satellite pairs; and
    calculating a variation in the carrier phase estimate for the reference receiver/satellite pairs in the current sample time period.

4. The method of claim 1, wherein detecting the phase scintillation event during the sample measurement at the phase scintillation monitor comprises:
    determining a phase scintillation monitor discriminator in a current sample time period for at least one reference receiver/satellite pair meets exclusion criteria.

5. The method of claim 4, wherein determining the phase scintillation monitor discriminator in the current sample time period for at least one reference receiver/satellite pair meets the exclusion criteria comprises:
    determining the phase scintillation monitor discriminator in the current sample time period for the at least one reference receiver/satellite pair is one of: greater than an exclusion threshold; or equal to the exclusion threshold.

6. The method of claim 1, wherein detecting the end to the phase scintillation event comprises:
    determining a phase scintillation monitor discriminator in the current sample time period for an excluded reference receiver/satellite pair meets readmittance criteria.

7. The method of claim 6, wherein determining the phase scintillation monitor discriminator in the current sample time period for the excluded reference receiver/satellite pair meets the readmittance criteria comprises:
    determining the phase scintillation monitor discriminator in the current sample time period for the excluded reference receiver/satellite pair is less than a readmit threshold.

8. The method of claim 6, wherein determining the phase scintillation monitor discriminator in the current sample time period for the excluded reference receiver/satellite pair meets the readmittance criteria comprises:
    determining the phase scintillation monitor discriminator in the current sample time period for the excluded reference receiver/satellite pair is less than a readmit threshold for a preselected number of samples.

9. The method of claim 6, wherein determining the phase scintillation monitor discriminator in the current sample time period for the excluded reference receiver/satellite pair meets the readmittance criteria comprises:
    determining the phase scintillation monitor discriminator in the current sample time period for the excluded reference receiver/satellite pair is less than a readmit threshold for a preselected number of consecutive samples.

10. A phase scintillation monitor to provide real-time screening for phase scintillation, comprising:
    at least one processor communicatively coupled to receive input from a plurality of reference receivers; and
    a storage medium tangibly embodying program instructions for execution by the at least one processor, wherein the program instructions are operable, when executed by the at least one processor, to:

detect a phase scintillation event during a sample time period;
exclude associated satellite measurement data from further use based on the detection of the phase scintillation event;
detect an end to the phase scintillation event; and
readmit associated satellite measurement data collected after the end of the phase scintillation event.

11. The phase scintillation monitor of claim 10, wherein the program instructions to detect the phase scintillation event during the sample measurement are further operable, when executed by the at least one processor, to:
determine a phase scintillation monitor discriminator in a current sample time period for at least one reference receiver/satellite pair meets exclusion criteria.

12. The phase scintillation monitor of claim 11, wherein the program instructions operable to determine the phase scintillation monitor discriminator in the current sample time period for the at least one reference receiver/satellite pair meets the exclusion criteria include program instructions operable, when executed by the at least one processor, to:
determine the phase scintillation monitor discriminator in the current sample time period for the at least one reference receiver/satellite pair is one of: greater than an exclusion threshold; or equal to the exclusion threshold.

13. The phase scintillation monitor of claim 10, wherein the program instructions operable to detect the end to the phase scintillation event include program instructions operable, when executed by the at least one processor, to:
determine a phase scintillation monitor discriminator in a current sample time period for an excluded reference receiver/satellite pair meets readmittance criteria.

14. The phase scintillation monitor of claim 13, wherein the program instructions operable to determine the phase scintillation monitor discriminator in the current sample time period for the excluded reference receiver/satellite pair meets the readmittance criteria include program instructions operable, when executed by the at least one processor, to:
determine the phase scintillation monitor discriminator in the current sample time period for the excluded reference receiver/satellite pair is less than a readmit threshold.

15. The phase scintillation monitor of claim 13, wherein the program instructions operable to determine the phase scintillation monitor discriminator in the current sample time period for the excluded reference receiver/satellite pair meets the readmittance criteria include program instructions operable, when executed by the at least one processor, to:
determine the phase scintillation monitor discriminator in the current sample time period for the excluded reference receiver/satellite pair is less than a readmit threshold for a preselected number of samples.

16. The phase scintillation monitor of claim 10, wherein the program instructions are further operable, when executed by the at least one processor, to cause the phase scintillation monitor to:
calculate a phase scintillation monitor discriminator in a current sample time period for at least one reference receiver/satellite pair.

17. The phase scintillation monitor of claim 16, wherein the program instructions to calculate the phase scintillation monitor discriminator in the current sample time period for the at least one reference receiver/satellite pair include program instructions operable, when executed by the at least one processor, to:
calculate satellite (SV) motion and SV clock corrected carrier rates for reference receiver/satellite pairs for which accumulated delta range data is available;
compensate a SV motion and a SV clock corrected carrier rate for a reference receiver clock by subtracting an average of all the other SV motion and SV clock corrected carrier rates from the SV motion and SV clock corrected carrier rates; and
calculate a reference receiver de-trended SV motion and SV clock corrected carrier rate for the reference receiver/satellite pairs in a sample time period.

18. The phase scintillation monitor of claim 17, wherein the program instructions to calculate the phase scintillation monitor discriminator in the current sample time period for the at least one reference receiver/satellite pair further include program instructions operable, when executed by the at least one processor, to:
compute a carrier phase estimate using numerical integration;
calculate a sample average of the carrier phase estimate for the reference receiver/satellite pairs; and
calculate a variation in the carrier phase estimate for the reference receiver/satellite pairs in the current sample time period, wherein the calculated variation in the carrier phase estimate is the phase scintillation monitor discriminator.

19. A method to compute a phase scintillation monitor discriminator and implement a real-time screening process, the method comprising:
calculating satellite (SV) motion and SV clock corrected carrier rates for reference receiver/satellite pairs for which accumulated delta range data is available;
compensating a SV motion and a SV clock corrected carrier rate for a reference receiver clock by subtracting an average of all the other SV motion and SV clock corrected carrier rates from the SV motion and SV clock corrected carrier rates;
calculating a reference receiver de-trended SV motion and SV clock corrected carrier rate for the reference receiver/satellite pairs in a sample time period;
computing a carrier phase estimate using numerical integration;
calculating a sample average of the carrier phase estimate for the reference receiver/satellite pairs;
calculating a variation in the carrier phase estimate for the reference receiver/satellite pairs in the current sample time period, wherein the variation in the carrier phase estimate is the phase scintillation monitor discriminator; and
excluding and admitting satellite measurement data relating to the receiver/satellite pairs based on the phase scintillation monitor discriminator.

* * * * *